United States Patent
Forstman

(10) Patent No.: US 10,770,188 B2
(45) Date of Patent: Sep. 8, 2020

(54) NUCLEAR REACTOR FUEL ASSEMBLY AND METHOD FOR PRODUCING SAME

(71) Applicant: STATE ATOMIC ENERGY CORPORATION "ROSATOM" ON BEHALF OF THE RUSSIAN FEDERATION, Moscow (RU)

(72) Inventor: Vladimir Aleksandrovich Forstman, Moscow (RU)

(73) Assignee: STATE ATOMIC ENERGY CORPORATION "ROSATOM" ON BEHALF OF THE RUSSIAN FEDERATION, Moscow (RU)

(*) Notice: Subject to any disclaimer, the term of this patent is extended or adjusted under 35 U.S.C. 154(b) by 0 days.

(21) Appl. No.: 16/473,868

(22) PCT Filed: Nov. 3, 2017

(86) PCT No.: PCT/RU2017/000817
§ 371 (c)(1),
(2) Date: Jun. 26, 2019

(87) PCT Pub. No.: WO2018/124934
PCT Pub. Date: Jul. 5, 2018

(65) Prior Publication Data
US 2019/0326024 A1    Oct. 24, 2019

(30) Foreign Application Priority Data

Dec. 26, 2016 (RU) ................................ 2016151504
Dec. 26, 2016 (RU) ................................ 2016151505

(51) Int. Cl.
*G21C 3/338* (2006.01)
*G21C 3/32* (2006.01)
*G21C 3/334* (2006.01)

(52) U.S. Cl.
CPC ............... *G21C 3/338* (2013.01); *G21C 3/32* (2013.01); *G21C 3/334* (2013.01)

(58) Field of Classification Search
CPC ... G21C 3/30; G21C 3/32; G21C 3/33; G21C 3/334; G21C 3/336; G21C 3/338
See application file for complete search history.

(56) References Cited

U.S. PATENT DOCUMENTS

| 2,938,848 A * | 5/1960 | Ladd ...................... G21C 3/338 |
| | | 376/424 |
| 3,687,805 A | 8/1972 | Desbois |
| 4,042,456 A | 8/1977 | Ip et al. |

FOREIGN PATENT DOCUMENTS

| FR | 1425091 A | 1/1966 | |
| FR | 2059139 A5 * | 5/1971 | ............ F28F 9/0137 |

(Continued)

OTHER PUBLICATIONS

International Search Report of corresponding International Application No. PCT/RU2017/000817 dated Jan. 31, 2018, 3 pages.

(Continued)

*Primary Examiner* — Sharon M Davis
(74) *Attorney, Agent, or Firm* — Brooks Kushman P.C.

(57) ABSTRACT

A fuel assembly design for nuclear reactors that is used in fast neutron reactor cores to provide more reliable spacing of a fuel element bundle in a fuel assembly and reduced local stress in the cladding of the fuel elements in the region where the elements are in contact with spacing elements. The fuel assembly has a top nozzle and a bottom nozzle which are connected to one another by a jacket. A bundle of rod-type fuel is elements arranged in the fuel assembly with the aid of a grid and spiral spacer elements wrapped around the cladding of each fuel element. At least the peripheral fuel elements in the bundle are provided with spacer elements in the form of thin-walled tubes with longitudinal through (Continued)

Figure 1:
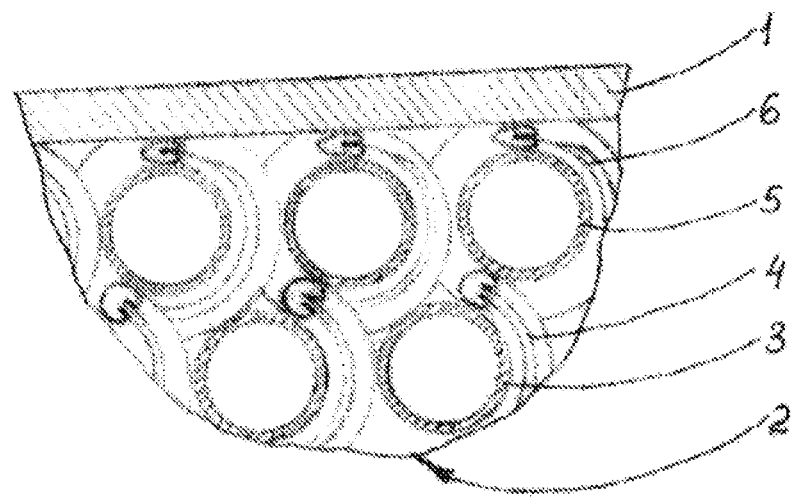

slots, wherein the elements have a substantially oval cross section in the regions where they are in contact with the jacket.

12 Claims, 1 Drawing Sheet

(56) References Cited

FOREIGN PATENT DOCUMENTS

| | | | |
|---|---|---|---|
| FR | 2146974 A1 * | 3/1973 | ............ G21C 3/336 |
| RU | 2088982 C1 | 8/1997 | |
| RU | 2106023 C1 | 2/1998 | |
| RU | 2340019 C1 | 11/2008 | |
| RU | 2528952 C1 | 9/2014 | |
| SU | 1702435 A1 | 12/1991 | |
| SU | 1685195 C1 | 5/1996 | |

OTHER PUBLICATIONS

Written Opinion of corresponding International Application No. PCT/RU2017/000817 dated Jan. 31, 2018, 10 pages.

Development, Production and Operation of Fuel Elements of Power Reactors, Moscow, Energoizdat, 1995, Book 2.

* cited by examiner

NUCLEAR REACTOR FUEL ASSEMBLY AND METHOD FOR PRODUCING SAME

CROSS-REFERENCE TO RELATED APPLICATIONS

This application is the U.S. national phase of International Application No. PCT/RU2017/000817 filed Nov. 3, 2017, which claims priority to Russian Patent Application Nos. RU 2016151504 and RU 2016151505 filed Dec. 26, 2016, the disclosures of which are incorporated in their entirety by reference herein.

The invention relates to fuel assembly designs for nuclear reactors and can be used in fast neutron reactor cores.

A fuel assembly for nuclear reactors with rod-type fuel elements is a top nozzle and a bottom nozzle connected to one another by a structural frame providing the fuel assembly with the necessary strength and rigidity. Between the top nozzle and the bottom nozzle of the fuel assembly, a fuel element bundle allowing for free temperature and radiation expansion is installed with the aid of retaining and spacing elements along the fuel assembly axis in the reactor core. The top nozzle and the bottom nozzle of the fuel assembly are fitted with means for installing and retaining the fuel assembly in the reactor core, and also with means for removing the fuel assembly from the reactor. Different embodiments of the fuel assembly designs with rod-type fuel elements for thermal and fast neutron reactors have been developed; they differ from one another in the specific design of the aforementioned structural elements and in the materials they are made of.

A fuel assembly for the WWER-type nuclear reactor is known comprising top nozzle, a bottom nozzle and a central pipe connected to one another by a jacket of hexagonal form, inside which a fuel element bundle in the form of fuel kernels in sealed cylindrical claddings is placed using retaining and spacing elements (RU2088982). Means for retaining fuel elements in a fuel assembly and for their transverse spacing in the bundle are provided in the form of top and bottom end grids and several spacing grids installed between the end grids. The fuel element butts are fixed in the end grids, wherein the top grid is configured to move along the axial direction in slots provided in the jacket corners. Spacing grids are installed on the central pipe and can move along the axial direction in slots provided in the central pipe.

The use in the known solution of several grids for retaining and spacing of fuel elements results in increased hydraulic resistance for coolant flow and worse heat transfer conditions. Moreover, corrosion and radiation-induced creep of the grid material in the core section leads to a change in the geometry of cells and in the elastic properties of the grid materials, which increases the probability of vibration and fretting of the cladding of individual fuel elements.

A design for fuel assemblies for power thermal and fast neutron nuclear reactors is known comprising a top nozzle, a bottom nozzle, a frame, top and bottom end grids, spacing elements and a bundle of rod-type fuel elements arranged in the fuel assembly with the aid of the end grids and spacing elements (RU 2340019). The frame connects the top nozzle and the bottom nozzle and is made in the form of a jacket, a central pipe with end grids installed thereon, and tie bars installed in end grids along the fuel assembly perimeter. The spacing elements are made in the form of longitudinal tubes installed in parallel between the fuel elements and fixed in end grids, and also in the form of perforated shell rings arranged inside the fuel assembly along the jacket perimeter. The spacing element tubes can be made with a longitudinal slot and cuts forming cylindrical spacing ribs connected with each other and arranged along the height of the fuel assembly at a specified pitch. The frame is fitted with several retaining elements, which wrap around the fuel element bundle and are installed along the height of the frame. The retaining elements are made of a material (for example, a molybdenum-based material) with a coefficient of linear expansion lower than the coefficient of the fuel element claddings (for example, steels EP-823). The invention is intended to ensure reliable spacing of fuel elements in the reactor core.

One drawback of the known design of the fuel assembly is its increased metal intensity due to the presence of a frame in the form of a jacket, support elements, central pipe and perforated shell rings. The fuel assembly has a complex structure providing for installation of a fuel element bundle, tube-type spacing elements and a system of frame tie bars in the bottom and top end grids. This results in reduction of the flow section for passage of coolant in the grids area and increased hydraulic resistance of the fuel assembly.

A fast neutron nuclear reactor fuel assembly for BN-type reactors with rod-type fuel elements is known including a top nozzle, a bottom nozzle and a jacket in the form of a hexagonal section pipe (Development, Production and Operation of Fuel Elements of Power Reactors. Moscow, Energoizdat, 1995, Book 2, page 158). A fuel element bundle with cladding of an external diameter within the range of about 6 mm and a thickness of cladding of about 0.3 mm is placed inside the fuel assembly with the aid of retaining and spacing elements. Stainless steel is used for fabrication of fuel assembly elements and fuel element cladding. The means for retaining and spacing of fuel element bundle in the fuel assembly are made in the form of a support grid and wires with a diameter of about 1 mm wrapped in a spiral with a pitch of about 100 mm around the fuel element cladding surface. In order to equalize the release of energy and consumption of coolant along the core section, the peripheral row of fuel elements (fuel elements installed directly at the jacket wall) in the fuel assembly is spaced with the aid of wires with an oval cross section of 1.3×0.6 mm.

One drawback of this design for the fuel element is the rigidity of the spacing element in the transverse plane. As a result, swelling of fuel and increase in the diameter of the fuel element claddings in the process of fuel irradiation in the core lead to an increase in local stress in the thin-walled cladding of fuel elements, its deformation and the acceleration of pitting corrosion processes in the zone of contact between the cladding and the spacing element.

Moreover, the use of a spacing element in the form of a wire with an oval cross section substantially changes the conditions for placing and spacing peripheral fuel elements inside a fuel assembly. Thus, along the height of the fuel assembly equal to the pitch of the wire wrapping, each fuel element placed inside the bundle with a triangular grid has contact with adjacent fuel elements at 12 points. Meanwhile, 6 contacts are formed between its spacing element and the claddings of adjacent fuel elements, and 6 more contacts are formed between the cladding of this fuel element and the spacing elements of the six adjacent fuel elements.

Each fuel element in the peripheral row (except for the corner elements) is adjacent to two other peripheral fuel elements, two internal fuel elements in the bundle, and the jacket. Along the height of the fuel assembly equal to the pitch of the wire wrapping, each peripheral fuel element has three spacing contacts only: two contacts between its cladding and the round wires of two internal fuel elements in the bundle, and one contact between its wire with an oval cross section and the fuel assembly jacket. This is due to the fact that the oval-shaped spacing element is not in contact with the claddings of the four adjacent fuel elements and the gap between them is 0.45 mm (1.05-0.6). In this way, the peripheral fuel elements of the known solution have four times (12/3) fewer spacing contacts than the fuel elements arranged inside the bundle. When compensating for spacing loads in a fuel element bundle, this results in a significant increase in stress within the zones of contact between the claddings of peripheral fuel elements and the spacing elements of internal fuel elements and the fuel assembly jacket, which contributes to the acceleration of pitting corrosion processes acting on the cladding and increases the probability of destruction of its integrity.

One drawback of the known solution is the complexity of the fabrication of fuel elements and fuel assemblies, in which fuel elements with an increased diameter of cladding (about 10 mm) and wire (about 3 mm) and a distance between the claddings of adjacent fuel elements of more than 3 mm are used. In this case, the use of the known design is related to the massive and rigid wire made of stainless steel wrapped around the thin-walled cladding of fuel elements, which results in deformation of the cladding and disruption of the geometrical form of the fuel element (for example, bending of the element).

The objective of the invention is to improve the reliability of a fuel assembly in the core of a nuclear reactor, improve the metal intensity of a fuel assembly, and develop a fuel assembly design for the use in lead-cooled fast neutron reactors and reactors with nitride uranium-plutonium fuel.

The technical result of the invention is to increase the reliability of a fuel element bundle spacing in a fuel assembly and reduce the local stress in the claddings of fuel elements within the region, in which said elements are in contact with spacing elements.

The technical result is achieved by the fact that, in the fuel assembly (including a top nozzle and a bottom nozzle connected to one another with the aid of a jacket; a bundle of rod-type fuel elements arranged in the fuel assembly with the aid of a grid and spiral spacing elements wrapped around the cladding of each fuel element and fixed at their ends), at least the peripheral fuel elements in a bundle are provided with spacing elements in the form of thin-walled tubes with longitudinal through slots, wherein the elements have a substantially oval cross section in the regions where they are in contact with the jacket.

Possible specific embodiments of fuel assemblies are characterized by the following parameters:
  all the fuel elements of a fuel assembly are provided with spacing elements (hereinafter elements) in the form of thin-walled round tubes with longitudinal through slots and the same external diameter;
  peripheral fuel elements are provided with elements in the form of thin-walled round tubes with longitudinal through slots, while the fuel elements inside the bundle are provided in the form of wire, wherein the elements and wires have the same external diameter,
  the width of the slot in the elements is set within 0.1 to 0.35 of its diameter
  the thickness of the element wall is set within 0.25 to 1 of the thickness of the fuel element cladding;
  parts of peripheral fuel elements have reduced resistance to deformation in the transverse plane as compared to the other fuel elements in the bundle;
  the width of the slots in peripheral fuel elements is set between 0.20 and 0.35, and in other fuel elements—between 0.1 and 0.30 of the element diameter;
  the wall thickness of peripheral fuel elements is set between 0.25 and 0.6, while that of the other fuel elements is between 0.4 and 1 of the fuel element cladding thickness.

The technical result is also achieved by the fact that, in the method for producing a fuel assembly (including forming a fuel element bundle with spiral spacing elements, placing the fuel element bundle in a jacket, and connecting the jacket with the top and bottom nozzles of the fuel assembly), at least the peripheral fuel elements in a bundle are provided with spacing elements in the form of thin-walled round tubes with longitudinal through slots, and the fuel elements assume a substantially oval cross section in the regions where they are in contact with the jacket through transverse compression of fuel element bundles during fabrication of a fuel assembly.

Possible specific options for implementing the fuel assembly production method are characterized by the following parameters:
  prior to the insertion of a fuel element bundle into a jacket, the bundle is compressed in the transverse plane with the aid of several hexagonal compressing rims, which are removed from the bundle surface one by one as it is inserted into the jacket;
  the fuel element bundle is compressed within the limits of the elastic deformation of the elements.

The essence of the invention consists in provision of a fuel element bundle with spacing elements in the form of spiral thin-walled tubes with longitudinal through slots, as well as in establishment of an aggregate of features ensuring the reliability of spacing of both internal and peripheral fuel elements and the reduction of local stresses in fuel element claddings.

The technical result is achieved due to the fact that the proposed solution allows the required cross profile of peripheral fuel elements to be formed: a round profile in the zone of contact with four adjacent fuel elements of the bundle, and an oval profile in the zone of contact with the jacket. The oval cross section of the element in its zone of contact with the jacket is formed directly from the round cross section during transverse compression and installation of the bundle of fuel elements in the jacket in the course of assembling the fuel assembly. Local deformation of peripheral fuel elements is achieved under the impact of two factors: a) concentration of expanding pressures of fuel element bundles in the zones of contact between the elements and the jacket, and b) the reduced resistance of these elements to deformation in the transverse direction compared to other fuel assembly elements. Reduced resistance to deformation is the result of a relative increase in the slot width and a decrease in the thickness of the walls of the peripheral fuel elements. At the first stage of compression of a bundle, technological gaps are selected and an oval cross section of elements is formed in their zones of contact with the jacket; next, the required spacing tension of the fuel element bundle in the jacket is achieved.

Improved reliability of fuel element spacing is also achieved due to the fact that the proposed solution ensures, at each pitch of wrapping of the element, 9 points of contact for the dimensional spacing of each peripheral fuel element. Five contacts are formed by the fuel element and the cladding of four adjacent fuel elements and the jacket, and four contacts are formed by the cladding of this fuel element with adjacent fuel elements. As compared to the known fuel assembly described in the prototype, the invention 3 times increases the number of spacing contacts of peripheral fuel elements threefold (9/3). The solution makes it possible to substantially increase the uniformity and decrease the degree of local mechanical stresses both in the claddings of peripheral fuel elements and in the claddings of other fuel elements of the bundle occurring due to the impact of the elements upon the temperature and radiation swelling of fuel.

The technical result is also achieved by the use of a method for producing a fuel assembly, according to which at least peripheral fuel elements in a bundle are provided with spacing elements in the form of thin-walled round tubes with longitudinal through slots, and the fuel elements assume a substantially oval cross section in the regions where they are in contact with the jacket through transverse compression of fuel element bundles during fabrication of a fuel assembly.

Specific exemplary embodiments of the fuel assembly and variations on the method for producing it using the proposed solution are given in more detail below.

The preferred embodiment is provision of all fuel assembly elements with the elements in the form of thin-walled round tubes with longitudinal through slots and the same external diameter. This design permits both substantial improvement in the reliability of spacing of peripheral fuel elements and a decrease in local stresses in the claddings of all fuel elements of a bundle. This is achieved by deformation of elements given a temperature and radiation increase in the cladding diameter.

One possible embodiment of the invention is the provision of peripheral fuel elements with elements in the form of thin-walled round tubes with longitudinal through slots, and provision of the fuel elements inside the bundle with wire spacing elements. In this case, the exterior diameters of the elements and wires are equal, providing reliable spacing of all fuel elements of the bundle. Some reduction of local stresses in the claddings of all fuel elements of a bundle is provided due to additional deformation of peripheral fuel elements. However, this design can be implemented only for the fuel assemblies, in which spacing elements with a relatively small diameter (up to 1.5-2 mm) are used.

The fuel assembly design ensures compensation for temperature and radiation swelling of fuel element claddings in the reactor core by making possible deformation of the element when spacing loads increase. Deformation of an element in the transverse direction within the limits of the slot width takes place due to bending of the element profile in the transverse plane, and does not result in a significant increase in contact stress in the cladding of the fuel element, which improves its reliability at high levels of fuel burnout. Moreover, this element design ensures input and output of coolant in the reactor core through the element slot both in the longitudinal and in the transverse direction. It decreases the probability of coolant impurities settling in local sites as well as the probability that areas of overheating and corrosion of the cladding of the fuel element will form. Given that the cladding burns out and swells along the height of the fuel element in a non-uniform manner, the width of the slot can vary. It can be smaller in the middle part of the element than in the peripheral part.

In order to assure an optimal combination of longitudinal rigidity of spacing elements and reduction of loads during their transverse deformation, the wall thickness of the element is set between 0.25 and 1 of the fuel element cladding thickness. Said value for the element wall thickness and its fabrication from the same material as the material of the fuel element cladding (for example, from stainless steel) helps to create optimal conditions for ensuring the strength and reliability of weld joints between end sections of the element and the cladding of the fuel elements or its end plugs. The element can be made from a thin-walled tube, in which a through cut is made to create a longitudinal slot of a set width, or else by bending a thin-walled strip. The width of the slot in the element can be created both by milling of the tube and by cutting and bending inside the tube of the cut edges without removal of metal. Elements with edges bent inside along the line of the cut increase the rigidity and stability of the element shape during the process of fabrication of the fuel element and also when fuel burns out in the core.

Reduced resistance to deformation in the transverse plane for the spacing elements of the peripheral fuel elements is achieved by the relative increase of their slot width from 0 to 0.35 of the element diameter, with the slot width of elements of other fuel elements ranging from 0.1 to 0.25 of the element diameter. To additionally reduce resistance to transverse deformation, the wall thickness of peripheral fuel elements is set between 0.25 and 0.6 of the thickness of the fuel element claddings, and the wall thickness of other fuel elements is set between 0.4 and 1 of the thickness of the fuel element claddings. In each specific case, varying these parameters makes it possible to ensure substantial deformation of the spacing elements of peripheral fuel elements in their zones of contact with the jacket, and to form in these zones an oval cross section of an element of given dimensions directly when assembling a fuel assembly.

In accordance with the method for production of a fuel assembly, peripheral fuel elements assume a substantially oval cross section in the regions where they are in contact with the jacket by transverse compression of fuel element bundles during production of a fuel assembly. Transverse compression of fuel elements fixed in a grid is carried out either directly, due to pressure from the jacket sides when the bundle is inserted in the jacket, or with the aid of several hexagonal compressing rims. Rims are put on a fuel element bundle in an open state, and then their parts are pulled together until fitting gaps between fuel elements and elements are created and until assumption of an oval cross section by peripheral fuel elements at their points of contact with the rims. The fuel assembly jacket is put on the assembled fuel element bundle beginning with its butt; next, the compressing rims are removed from the bundle surface one by one as the bundle is inserted inside the jacket. As a result, a bundle with a cross section of the given form and an oval cross section of the peripheral fuel elements in their zones of contact with the jacket is formed inside the jacket. Since the fuel element bundle is compressed within the limits of elastic deformation of the elements, the bundle can be installed in the fuel assembly jacket with a certain tension in the zones of contact between the fuel elements in the bundle and between the bundle and the jacket. Selection of element parameters within said limits makes it possible to select technological gaps at the first stage of compression of the bundle and to form an oval cross section of elements in their zones of contact with the jacket, and then to ensure the required spacing tension of the fuel element bundle in the jacket and the jacket itself.

Figure 2:
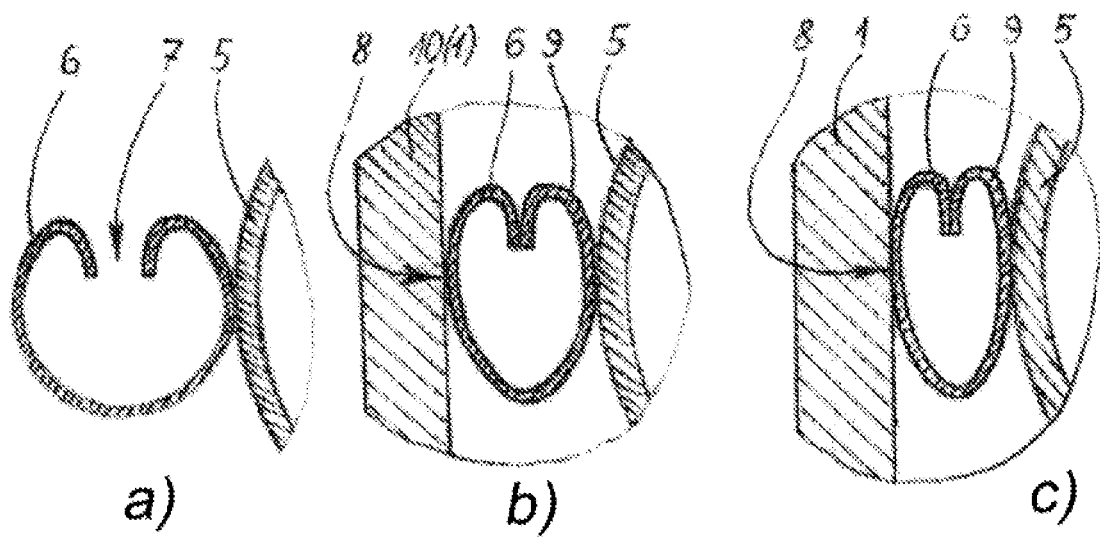

FIG. 1 and FIG. 2 provide illustrations of the formation of a fuel assembly and the method for its production in accordance with the invention. FIG. 1 shows a fragment of the cross section of a fuel assembly with a triangular grid for packing fuel elements into a bundle. FIG. 2 shows fragments of the cross section of a fuel assembly in the zone of contact of the peripheral fuel element with the jacket in different conditions of deformation of the element cross section.

In accordance with the invention, the fuel assembly includes a top nozzle and a bottom nozzle (not shown in the illustrations), connected to one another with the aid of a jacket (1); and a bundle (2) of rod-type fuel elements arranged in a fuel assembly with the aid of a grid (not shown). The bundle consists of internal fuel elements (3) with spacing elements (4), along with peripheral fuel elements (5) with spacing elements (6), which are in contact with the jacket (1). The spacing elements (4) and (6) are provided with longitudinal through slots (7). The elements (6) of fuel elements (5) of the peripheral row in their zones of contact (8) with the jacket (1) have a substantially oval cross section (9) (FIG. 1 shows the oval shape (9) in the plane passing through the contacts (8)).

The width of the slot (7) in the elements (4) and (6) is set between 0.1 and 0.35 of the element diameter. The wall thickness of elements (4) and (6) is set between 0.25 and 1 of the thickness of the fuel element cladding. The elements (6) of the peripheral fuel elements (5) have reduced resistance to deformation in the transverse direction as compared to the elements (4). For this purpose, the width of the slots (7) in the elements (6) is set between 0.20 and 0.35 of the element diameter, with corresponding values between 0.1 and 0.30 for the elements (4); the wall thickness of the peripheral fuel elements (5) is set between 0.25 and 0.6 of the fuel element cladding thickness, while the corresponding figures for the internal fuel elements (3) are between 0.4 and 1.

Fuel assemblies are produced as follows. According to the known technology, a fuel element bundle with elements is formed by fastening their lower end parts in a grid (not shown in the figures). Transverse compression of the bundle (2) can be achieved, for example, through direct contact of the bundle with the internal sides of the jacket when it is inserted inside the jacket. Transverse compression of the bundle (2), consisting of fuel elements (3) and (5), can be also carried out with the aid of several two-piece hexagonal rims (10), which in contracted conditions have a cross section identical to the cross section of the fuel assembly jacket (1). The rims (10) are put on a bundle (2) in the open position; next, the halves of the rims are pulled towards one another and the bundle is compressed in the transverse plane until fitting gaps are created, and then until the deformation of elements (6) in their zones (8) of contact with the rims (11) with the oval cross section (9). Next, the free end of the contracted bundle (2) is inserted in the jacket (1) and the jacket is put on the bundle by removal of the rims (10) one by one as they are replaced by the jacket (1). As a result, a bundle (2) with the cross section of the given shape (for example, hexagonal) and an oval cross section (9) of the fuel elements (5) in their zone (8) of contact with the jacket (1) are formed in the jacket (1). FIG. 2*a* shows the initial condition of the cross section of the element (6) before the bundle is compressed, and FIG. 2*b* shows the oval cross section of the element (6) after the bundle (2) has been compressed by the rims (10); this cross section does not change even after insertion of the bundle (2) into the jacket (1). Compression of the bundle (2) in the rims (10) and the jacket (1) is carried out within the limits of elastic deformation of the elements (4) and (6), which ensures the controlled spacing tension between the fuel elements in the bundle, as well as between the peripheral fuel elements (5) and the jacket (1).

In the process of irradiation of fuel in the core, radiation swelling of fuel and increase of the fuel element cladding diameter occur. In accordance with the invention, in a fuel assembly, these changes of dimension are compensated for in the transverse plane by substantial deformation of the elements (4) and (6). The shape of the cross section of the element (6) in conditions of additional deformation is shown in FIG. 2*c*), while the shape of the cross section of the element (4) changes as the slot (7) width decreases as far as the oval cross section shown in FIG. 2*b*). The reliability of peripheral fuel element spacing improves significantly, affecting nine points of contact in the invention (three in the known solution). This results in reduction of local stresses in the thin-walled fuel element cladding, as well as in a decrease in pitting corrosion processes in the zones of contact between the claddings and the elements.

Said properties of the fuel assembly allow it to be used for planned lead-cooled fast neutron reactors and reactors with nitride uranium-plutonium fuel, in which the exterior diameter of the cladding can be more than 10 mm, and the minimum distance between the claddings of adjacent fuel elements can be more than 3 mm.

The proposed design of the fuel assembly makes it possible to reduce the metal intensity of the assembly due to the fabrication of elements in the form of thin-walled tubes. A longitudinal through slot in the element allows for a significant reduction in the likelihood of its deformation in the transverse plane, and for a reduction in the local stresses occurring in the cladding of the fuel element when fuel in the reactor core burns out. Achievement of said technical results helps to improve the neutronic parameters of the fast neutron nuclear reactor core and improve the operational reliability of the fuel elements and fuel assemblies. The technical solution allows the rigidity of the spacing element in the longitudinal direction to be substantially reduced. This makes it possible to wrap the blanks of a spacing element with a specified tension around the surface of thin-walled cladding without noticeable disruption of the geometrical shape of the fuel element. Moreover, the proposed design makes the weld joints of the spacing element and cladding highly reliable due to its homogeneous composition, its structure and the geometrical shape of the welded pieces. Said properties of the technical solution allow for its practical implementation during fabrication of fuel assemblies for new-generation power fast neutron nuclear reactors.

The new features of the design and method of fuel assembly arrangement, in conjunction with other features, allow simple and reliable means to be employed to ensure the required characteristics of the arrangement of fuel elements both inside a bundle and at its periphery. These characteristics include assurance of the specified level of local stresses in the zone of contact between the fuel element cladding and the spacing elements upon longitudinal and transverse changes in the dimensions of the fuel elements and the fuel assembly frame under the impact of temperature and radiation, and assurance of a minimum metal intensity of fuel assembly elements and simplicity of fabrication and arrangement of fuel assemblies. The proposed design can be used for fuel assemblies with various shapes of cross section, for example square or hexagonal.

The invention claimed is:
1. A nuclear reactor fuel assembly, comprising:
   a top nozzle and a bottom nozzle connected to one another with the aid of a jacket;
   a bundle of rod-type fuel elements arranged in the jacket with the aid of a grid and spacing elements, wherein the fuel elements comprise peripheral fuel elements in a peripheral row, and internal fuel elements,
   the spacing elements are spiral shaped and wrapped around cladding of each fuel element and fixed at ends of the fuel elements, wherein the spacing elements comprise peripheral spacing elements and internal spacing elements, wherein at least the peripheral fuel elements in the bundle are provided with the peripheral spacing elements formed as tubes with longitudinal through slots, wherein the peripheral spacing elements have a substantially oval cross section in regions where the peripheral spacing elements are in contact with the jacket.

2. The fuel assembly of claim 1, wherein the width of the slot in the spacing elements is between 0.1 and 0.35 of a spacing element diameter.

3. The fuel assembly of claim 1, wherein a thickness of a wall of the spacing elements is between 0.25 and 1 of the thickness of the cladding.

4. The fuel assembly of claim 1, wherein the peripheral spacing elements of the peripheral fuel elements have reduced resistance to deformation in the transverse direction compared to the internal spacing elements of the internal fuel elements in the bundle.

5. The fuel assembly of claim 4, wherein a width of the slots in the peripheral spacing elements is between 0.20 and 0.35, and a width of slots in internal spacing elements is between 0.1 and 0.30 of a spacing element diameter.

6. The fuel assembly of claim 4, wherein a thickness of the walls of peripheral spacing elements is between 0.25 and 0.6 of a thickness of the cladding, and a thickness of walls of internal spacing elements is between 0.4 and 1 of the thickness of the cladding.

7. The fuel assembly of claim 1, wherein the internal spacing elements are generally round tubes with longitudinal through slots.

8. The fuel assembly of claim 1, wherein the internal fuel elements are provided with wire spacing elements.

9. A method of producing the fuel assembly of claim 1, comprising:

creating the bundle of internal and peripheral fuel elements with the internal and peripheral spacing elements;

inserting the bundle in the jacket; and connecting the jacket with the top nozzle and bottom nozzle of the fuel assembly, compressing at least the peripheral spacing elements to assume the substantially oval cross section in the regions where the peripheral spacing elements are in contact with the jacket through compression of the bundle in the transverse plane.

10. The method of claim 9, wherein the compressing is carried out while inserting the bundle into the jacket.

11. The method of claim 9, wherein the compressing comprises, prior to inserting the bundle into the jacket, compressing the bundle in the transverse plane with several hexagonal compressing rims, which are removed from the bindle one by one as the bundle is inserted in the jacket.

12. The method of claim 9, wherein compressing the bundle is carried out within the limits of elastic deformation of the spacing elements.

\* \* \* \* \*

UNITED STATES PATENT AND TRADEMARK OFFICE
CERTIFICATE OF CORRECTION

PATENT NO. : 10,770,188 B2
APPLICATION NO. : 16/473868
DATED : September 8, 2020
INVENTOR(S) : Vladimir Aleksandrov Forstman et al.

Page 1 of 1

It is certified that error appears in the above-identified patent and that said Letters Patent is hereby corrected as shown below:

In the Claims

Column 10, Line 25, Claim 11:
After "which are removed from the"
Delete "bindle" and
Insert -- bundle --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*